United States Patent
Kumwenda

(10) Patent No.: US 11,448,181 B2
(45) Date of Patent: Sep. 20, 2022

(54) METHOD AND APPARATUS OF EXTRACTING ENERGY FROM WATER WAVES TO GENERATE ELECTRIC POWER

(71) Applicant: Misheck Harris Kumwenda, Lusaka (ZM)

(72) Inventor: Misheck Harris Kumwenda, Lusaka (ZM)

(*) Notice: Subject to any disclaimer, the term of this patent is extended or adjusted under 35 U.S.C. 154(b) by 114 days.

(21) Appl. No.: 16/633,193

(22) PCT Filed: Jul. 30, 2018

(86) PCT No.: PCT/IB2018/001514
§ 371 (c)(1),
(2) Date: Jan. 23, 2020

(87) PCT Pub. No.: WO2019/064080
PCT Pub. Date: Apr. 4, 2019

(65) Prior Publication Data
US 2021/0156355 A1 May 27, 2021

(30) Foreign Application Priority Data
Jul. 28, 2017 (ZM) .................................... 13/2017

(51) Int. Cl.
*F03B 17/00* (2006.01)
*F03B 13/22* (2006.01)
*F03B 13/18* (2006.01)

(52) U.S. Cl.
CPC ............ *F03B 17/005* (2013.01); *F03B 13/22* (2013.01); *F03B 13/1815* (2013.01);
(Continued)

(58) Field of Classification Search
CPC .... F03B 17/005; F03B 13/22; F03B 13/1815; F05B 2220/706; F05B 2260/4031;
(Continued)

(56) References Cited

U.S. PATENT DOCUMENTS 4,224,527 A * 9/1980 Thompson .............. F03B 17/06
290/54
5,420,463 A * 5/1995 Agostino .............. F03B 17/005
290/53
(Continued)

FOREIGN PATENT DOCUMENTS

| | | |
|---|---|---|
| GB | 1560499 A | 2/1980 |
| WO | 2012066521 A2 | 5/2012 |
| WO | 2014162096 A1 | 10/2014 |

*Primary Examiner* — Joseph Ortega
(74) *Attorney, Agent, or Firm* — Rumit Ranjit Kanakia

(57) ABSTRACT

(EN) This invention relates to method and apparatus for extracting energy from water waves to generate electric power. The wave energy converter uses sea wave oscillations, from a land-based position. It understood a land-based power take off apparatus (3) that is oscillated by waves conveyed to it by canal or tunnel. The canal has a funnel shaped intake (1) at the coastline, a wave control gate (9) positioned near the intake and a power take off apparatus (3) positioned inland across the canal with a float (8) that works pumping cylinders (7) that pump hydraulic fluid to turn an impulse turbine (5) coupled to an electricity generator to generate electricity. The canal depth is predetermined to float the float, of the power take off apparatus (3), at all tide levels.

57 Claims, 17 Drawing Sheets

Figure 1:
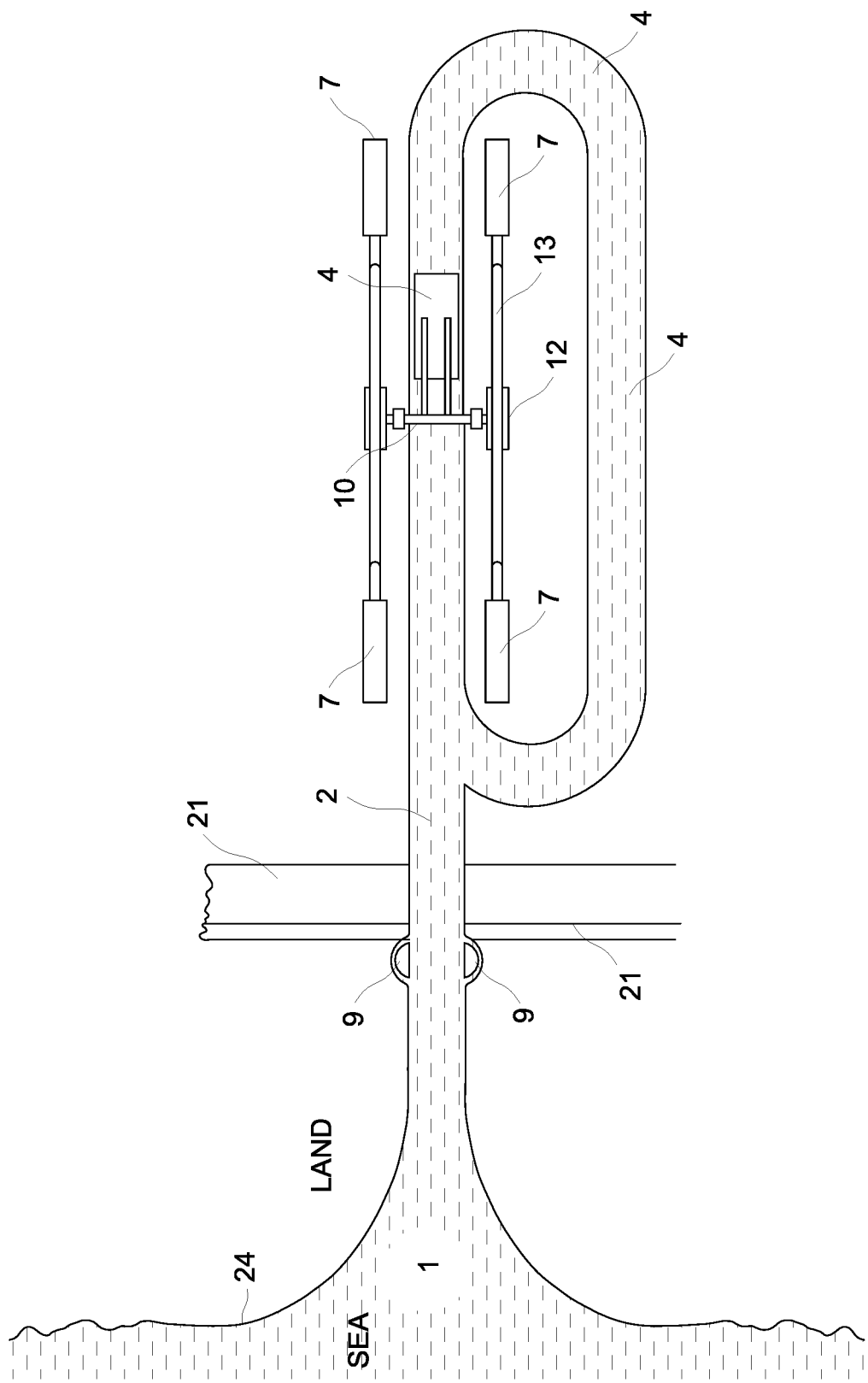

(52) U.S. Cl.
CPC ... *F05B 2220/706* (2013.01); *F05B 2260/406* (2013.01); *F05B 2260/4031* (2013.01)

(58) Field of Classification Search
CPC ............ F05B 2260/406; F05B 2240/40; F05B 2240/91; Y02E 10/30
See application file for complete search history.

(56) References Cited

U.S. PATENT DOCUMENTS

| | | | |
|---|---|---|---|
| 7,448,210 B1* | 11/2008 | Andalia | F04B 17/00 |
| | | | 60/498 |
| 7,579,704 B2 | 8/2009 | Steenstrup et al. | |
| 7,694,513 B2 | 4/2010 | Steenstrup et al. | |
| 7,956,478 B2 | 6/2011 | Steenstrup | |
| 2011/0289913 A1* | 12/2011 | Welch, Jr. | F03B 17/025 |
| | | | 60/495 |
| 2015/0210362 A1 | 7/2015 | Ruiz Diez | |
| 2016/0186714 A1* | 6/2016 | Filipek | F03B 13/08 |
| | | | 290/54 |
| 2019/0136822 A1* | 5/2019 | Huebner | B63B 35/38 |

* cited by examiner

METHOD AND APPARATUS OF EXTRACTING ENERGY FROM WATER WAVES TO GENERATE ELECTRIC POWER

FIELD OF THE INVENTION

The invention relates to a method and apparatus, enabling the extraction of energy from water waves in large open water bodies to generate electric power. The apparatus consists of a floater vessel which is mechanically connected to pump fluid by a hydraulic cylinder as the floater oscillates up and down due to wave action. The fluid pumped by the hydraulic cylinder drives a hydraulic motor or impulse turbine which is coupled to and drives electric generators to produce electric power. A hydraulic fluid reservoir is provided to supply and receive circulated fluid in the system. A hydraulic accumulator is connected in the system to even out output hydraulic pressure fluctuations. These apparatuses may take varied configurations with multiplicity of hydraulic cylinders and multiplicity of hydraulic accumulators within the same operating principles. The apparatus may be erected offshore or on the coastline.

BACKGROUND OF THE INVENTION

The potential for extracting energy from sea waves is considerable. It is said that worldwide wave power potential is around 2 terawatts. Water waves contain the highest energy density among renewable energy resources. Although much research has gone into the exploitation of this resource, it remains largely untapped. This is largely due to the difficulties posed by the violence of the sea. The irony lies in the fact that a calm sea is not of much use for energy extraction whereas a tumultuous sea offers abundant energy. There have been many publications of inventions for wave energy conversion but few have shown viable operational promise. Problems facing wave energy converters arise mainly from the exposure they have to the elements in and on the sea. These problems run through from installation, operation and onto maintenance. Development of commercially viable power generating converters has been seriously hindered by failure to focus efforts to effectively address these challenges. Further there are serious concerns regarding installation of wave energy converters in the sea. They are perceived to be intrusive and harmful to marine ecology. Wave energy converters installed offshore are regarded as obstacles to shipping and fishing.

Current publications of inventions on wave energy converters disproportionately concentrate on improving power conversion efficiencies when compared to the attention given to addressing how to overcome the hazards associated with the sea. A wave power converter has been developed with multiple float actuator power take off system where the floats are retractable during heavy sea storms, the whole power take off structure still remains vulnerable to battering by strong sea storms. This present invention addresses power take off efficiency and all sea hazard challenges. It offers a simple, affordable and very responsive design.

PURPOSE OF THE INVENTION

The purpose of the method and apparatus accordant with the present invention is to take the sea wave energy extraction process away from the open sea (off-shore) and bring it onto land (on-shore) adjacent to the sea, by making use of canals or tunnels. The purpose of the method and apparatus accordant with the present invention is to maximize wave energy extraction by looping the wave movement in a canal or tunnel back to the power-take-off apparatus in a continuous cycle. The purpose of the method and apparatus accordant with the present invention is to maximize wave energy extraction by limiting wave energy escape vents at power-take-off points. The purpose of the method and apparatus accordant with the present invention is to maximize wave energy extraction by capturing long wave fronts and concentrating them into a narrow canal. The purpose of the method and apparatus accordant with the present invention is to tap a controlled amount of sea wave energy from the sea into the canal when the sea wave activity exceeds tolerable limits. The purpose of the method and apparatus accordant with the present invention, with the exception of maintenance shut-down periods, is to generate electric power at all times, as long as there is significant wave action in the large open water body. The purpose of the method and apparatus accordant with the present invention is to shield the power-take-off apparatus from destructive sea waves when the sea wave activity exceeds tolerable limits. The purpose of the method and apparatus accordant with the present invention is to provide "dry-dock" maintenance conditions for the power-take-off apparatus during major maintenance periods. The purpose of the method and apparatus accordant with the present invention is to preserve the ecological status quo of marine environment. The purpose of the method and apparatus accordant with the present invention is to keep sea shipping and fishing lanes clear of wave energy converters. The purpose of the method and apparatus accordant with the present invention is to promote the generation and use of abundant environmentally friendly green electric energy from water waves in seas with minimum controversy.

SUMMARY OF THE INVENTION

The invention relates to a method and apparatus, enabling the extraction of energy from water waves in large open water bodies by utilizing water canals to transport wave energy on less hazardous locations on land to generate electric power.

According to one preferred embodiment of the invention, electricity generation from water waves in large open water bodies is achieved through a process of tapping wave energy from the sea by trapping a long wave front and concentrating it and the energy contained therein through a funnel shaped canal and channeling it through a canal where a power take off apparatus is positioned to convert the wave energy into mechanical energy. The mechanical energy is used to pressurize hydraulic fluid by means of hydraulic pumping cylinders. The pressurized fluid connects by hydraulic pipes to turn an impulse turbine or hydraulic motor to turn an electricity generator which generates electricity. The residual wave energy that passes beyond the power take off apparatus is channeled back to the front of the power take off apparatus through a loop-back canal to be further extracted for conversion into electricity. This process is repeated in a continuous cycle to provide maximum exploitation of available water wave energy.

The invention also relates to an apparatus for enabling the extraction of energy from water waves in large open water bodies to generate electric power. The apparatus comprises a canal dug on land to connect with the large open water body and leading away from it, a control-gate, a buoyant vessel, a power take off apparatus, two way pumping hydraulic cylinders, hydraulic piping, a large mounting frame assembly for piping and other apparatuses, a hydraulic fluid reservoir, an impulse turbine, an electricity generator.

It is further typical of the apparatus accordant with the invention that the control gate comprises a door or two each being opened or closed using hydraulic actuators with requisite power and controls.

It is further typical of the apparatus accordant with the invention that the control gate comprises a door or two each having an aperture with shutters which can be opened and closed using hydraulic actuators with requisite power and controls.

It is further typical of the apparatus accordant with the invention that the energy extraction from water waves is maximized by means of constrained wave passage at the power take off apparatus whereby the waves are fully restricted between the two canal walls, the canal floor and the base of the buoyant vessel.

It is further typical of the apparatus accordant with the invention that the power-take-off apparatus comprises an axle with gear wheels and geared elongated members or an axle with lever arms and linkage members connected to plain elongated members to act as a lever swiveling back and forth pushing and pulling pistons in hydraulic pumping cylinders.

It is further typical of the apparatus accordant with the invention that the two-way pumping hydraulic cylinders are fitted with hydraulic non-return valves on chambers on both sides of the piston such that the cylinders pressurize in either direction of the pumping stroke.

In one configuration of the apparatus accordant with the invention, the hydraulic system powers an impulse turbine.

In another configuration the apparatus accordant with the invention, the hydraulic system powers a hydraulic motor.

LIST OF DRAWINGS

FIG. 1 presents a plan view according to one configuration of the elongated channel and a power-take off apparatus accordant with the invention (mountings, support frame and hydraulic piping not shown for purposes of clarity)

Figure 2:
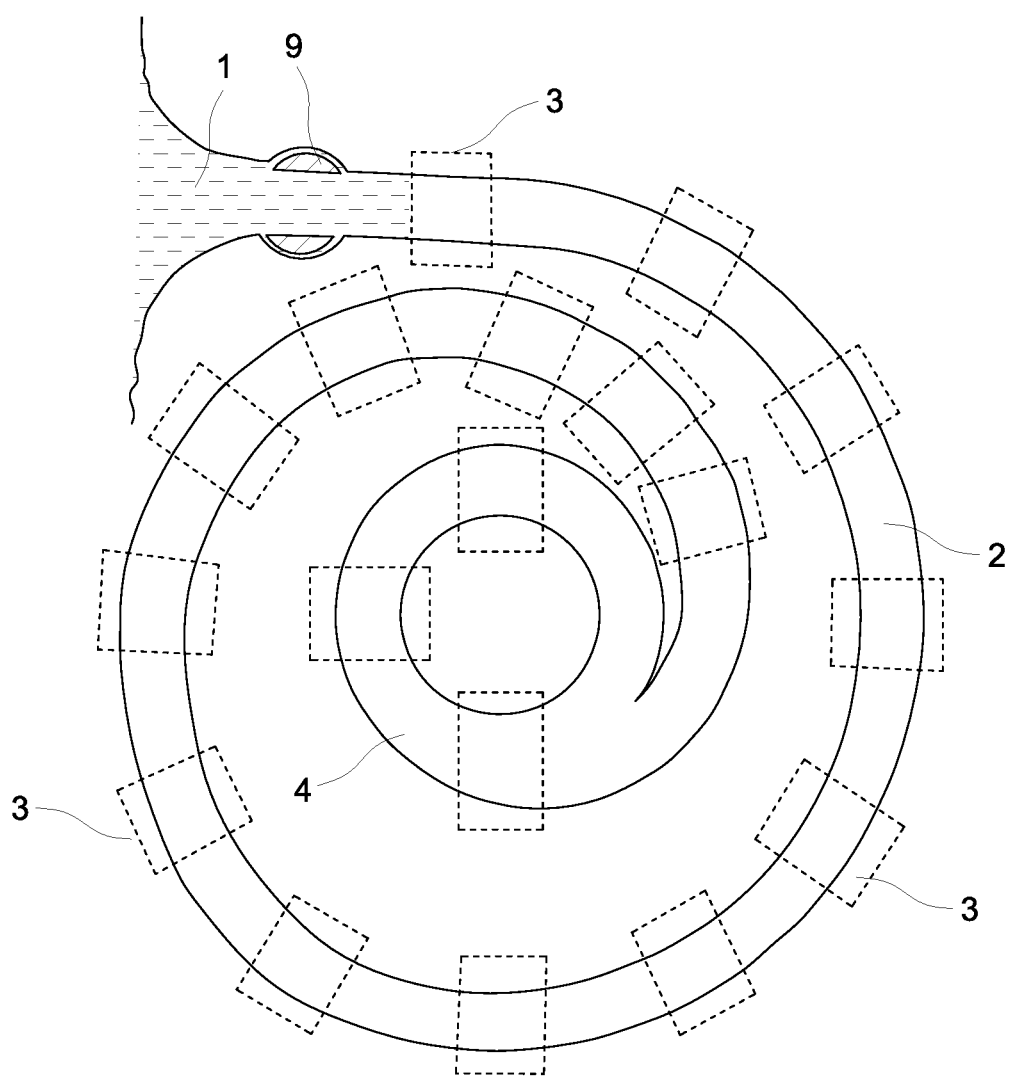
Figure 3:
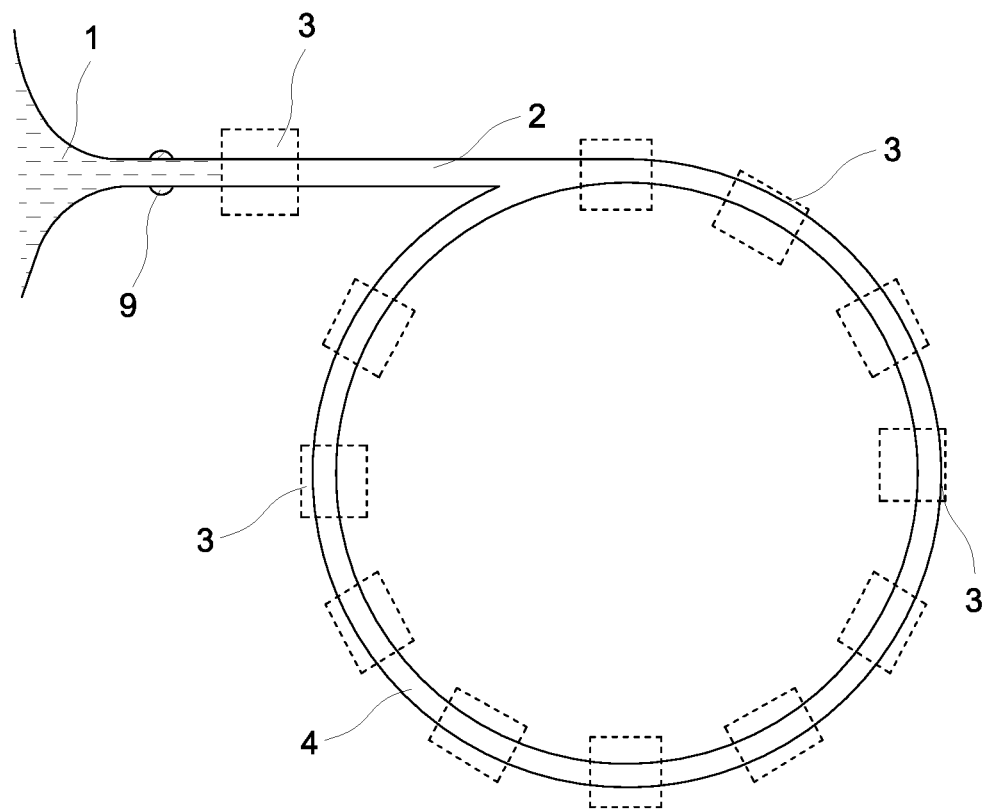

FIG. 2 presents a plan view of a spiral-circle alternative path configuration of the canal showing positions of multiple power-take-off apparatuses FIG. 3 presents a plan view of a circular alternative path configuration of the canal showing positions of multiple power-take-off apparatuses.

Figure 4:
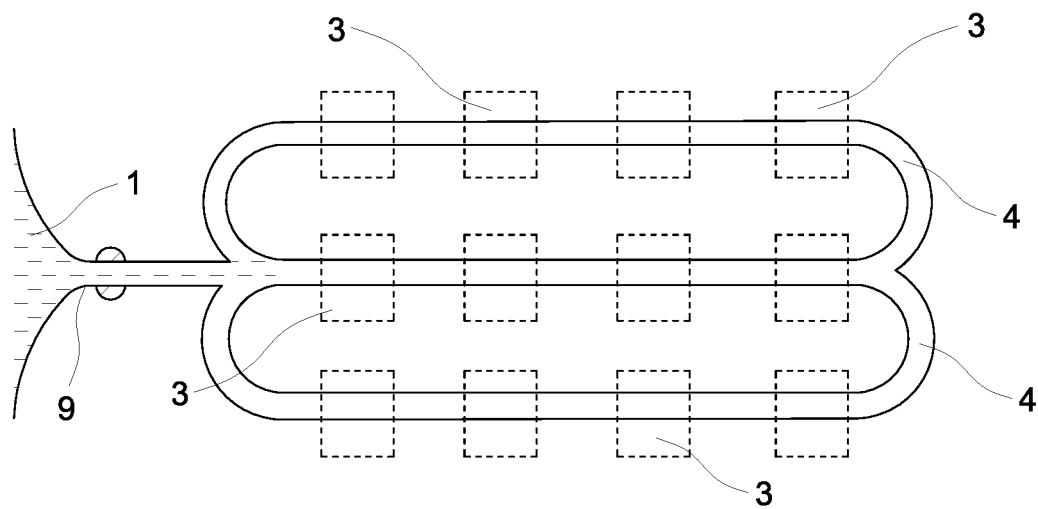

FIG. 4 presents a plan view of a figure "8" alternative path configuration of the canal showing positions of multiple power-take-off apparatuses.

Figure 5:
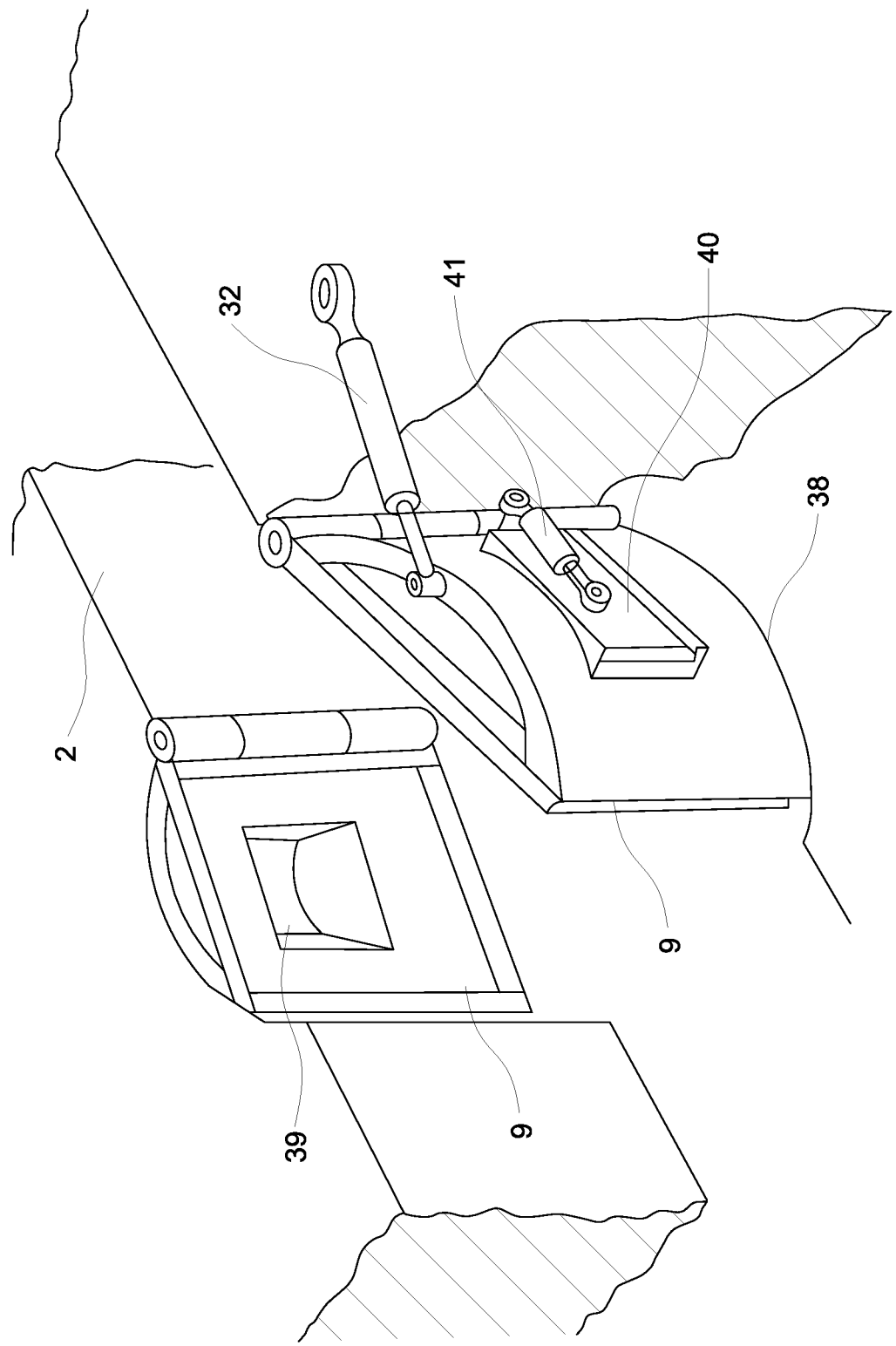

FIG. 5 presents an exposed pictorial view of two barrier doors showing apertures, shutter and hydraulic actuators accordant with the invention.

Figure 6:
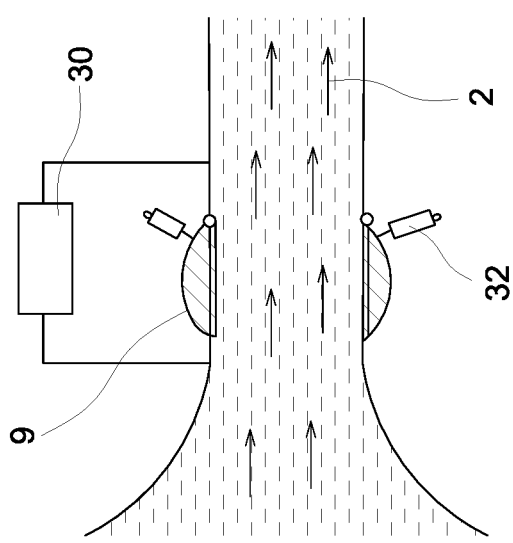

FIG. 6 presents a plan view of canal at the two barrier door position showing the two barrier doors in open position accordant with the invention.

Figure 7:
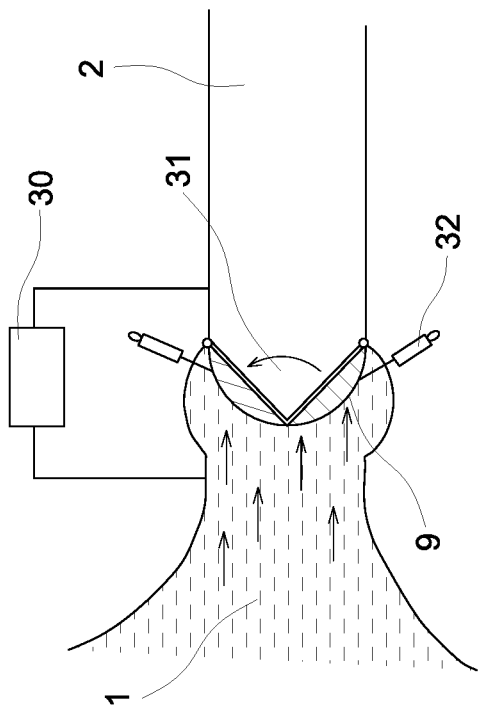
Figure 8:
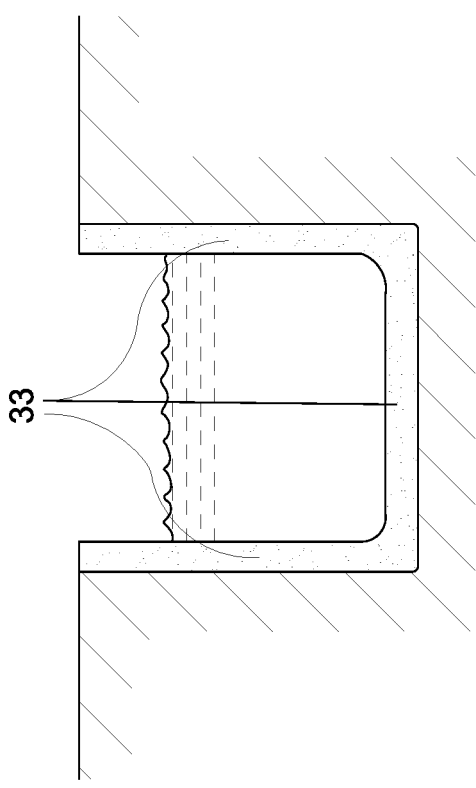

FIG. 7 presents a plan view of canal at the two barrier door position showing the two barrier doors in closed position accordant with the invention FIG. 8 presents a cross-sectional view of canal showing erosion resistant lining of the side walls and floor accordant with the invention.

Figure 9:
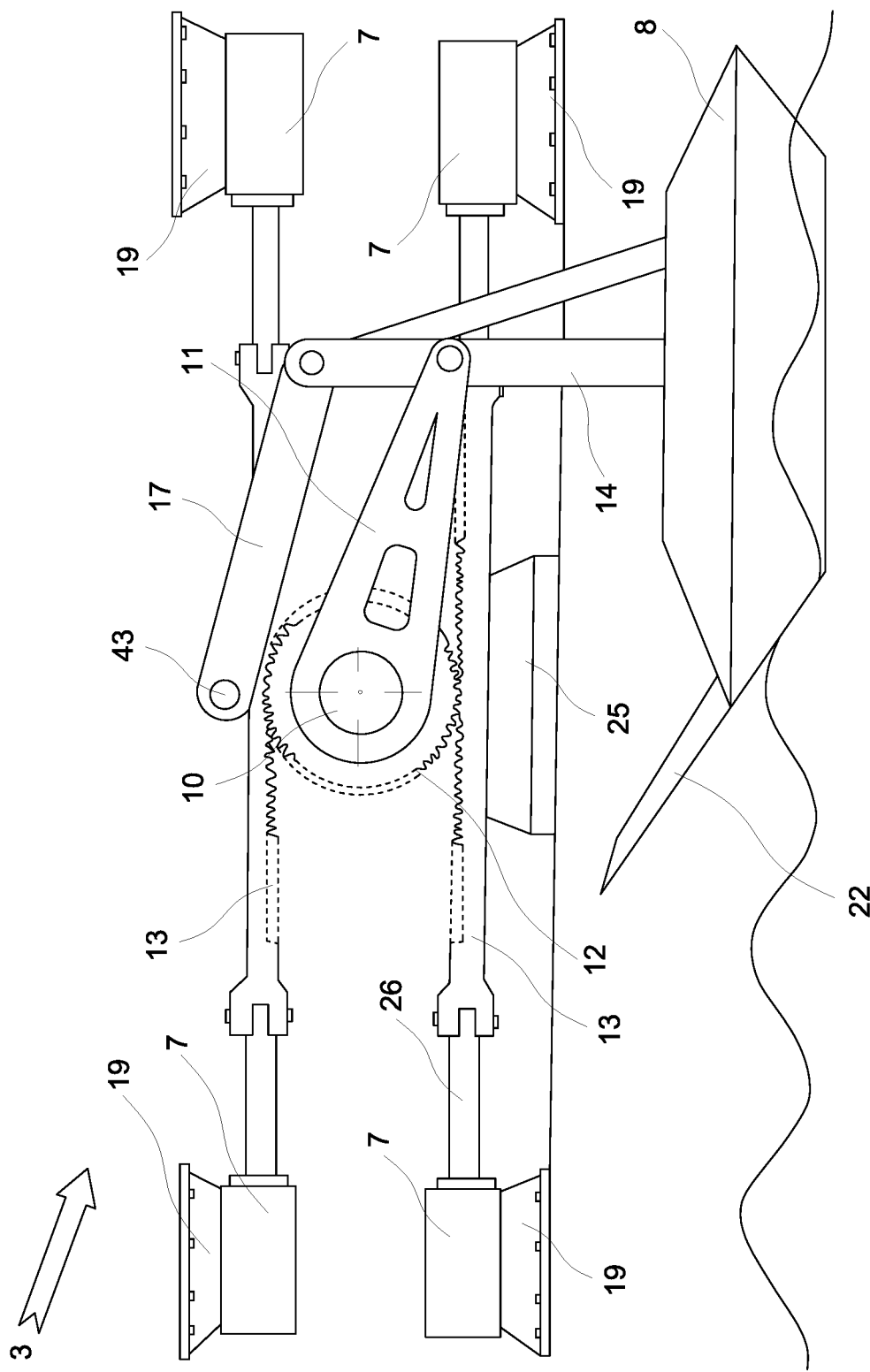

FIG. 9 presents a side view of buoyant vessel and power-take-off apparatus accordant with the invention (Mountings, support frame and hydraulic piping not shown for purposes of clarity)

Figure 10:
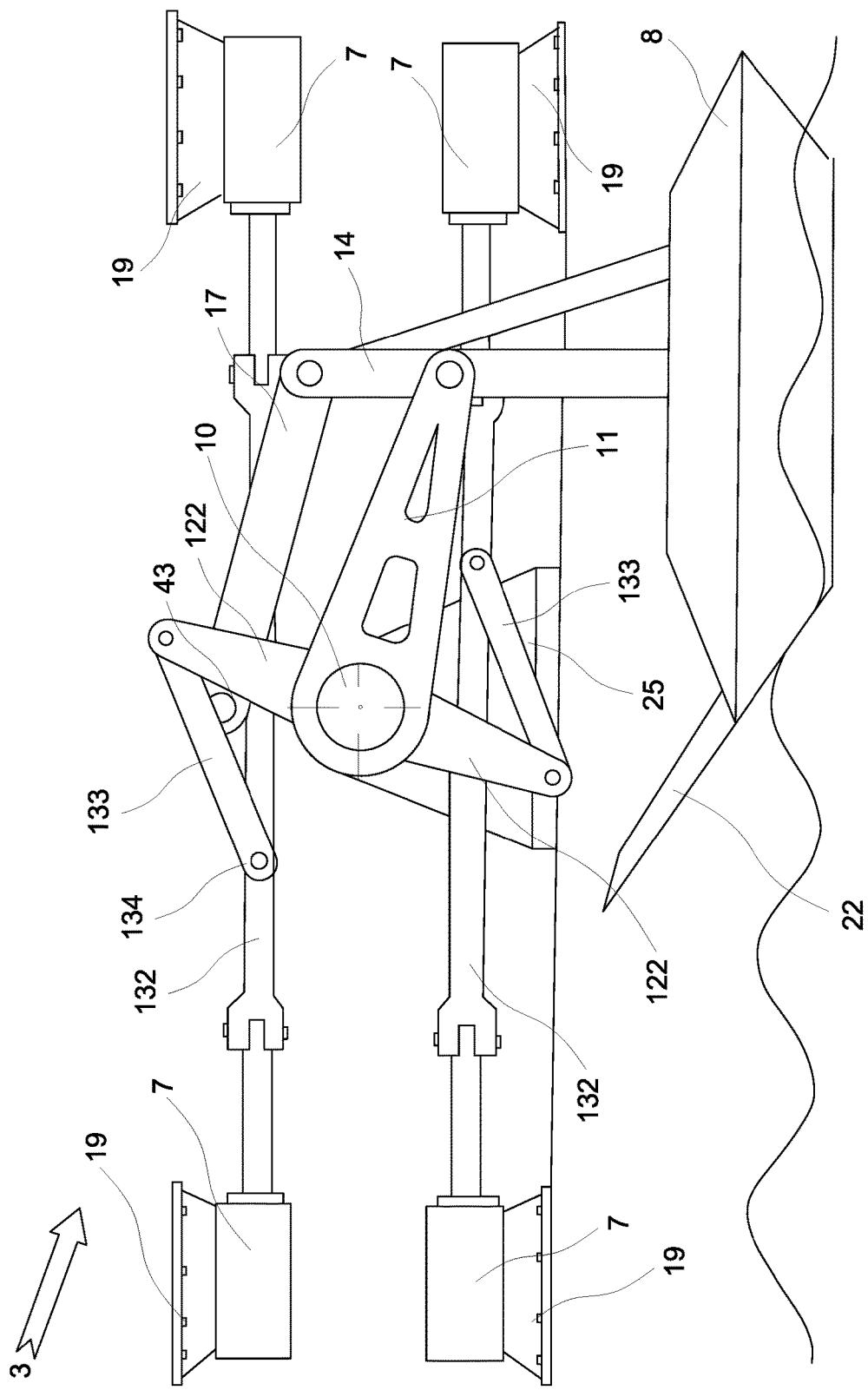

FIG. 10 presents a side view of buoyant vessel and power-take-off apparatus using lever arm member alternative to the gear wheel accordant with the invention (Mountings, support frame and hydraulic piping not shown for purposes of clarity)

Figure 11:
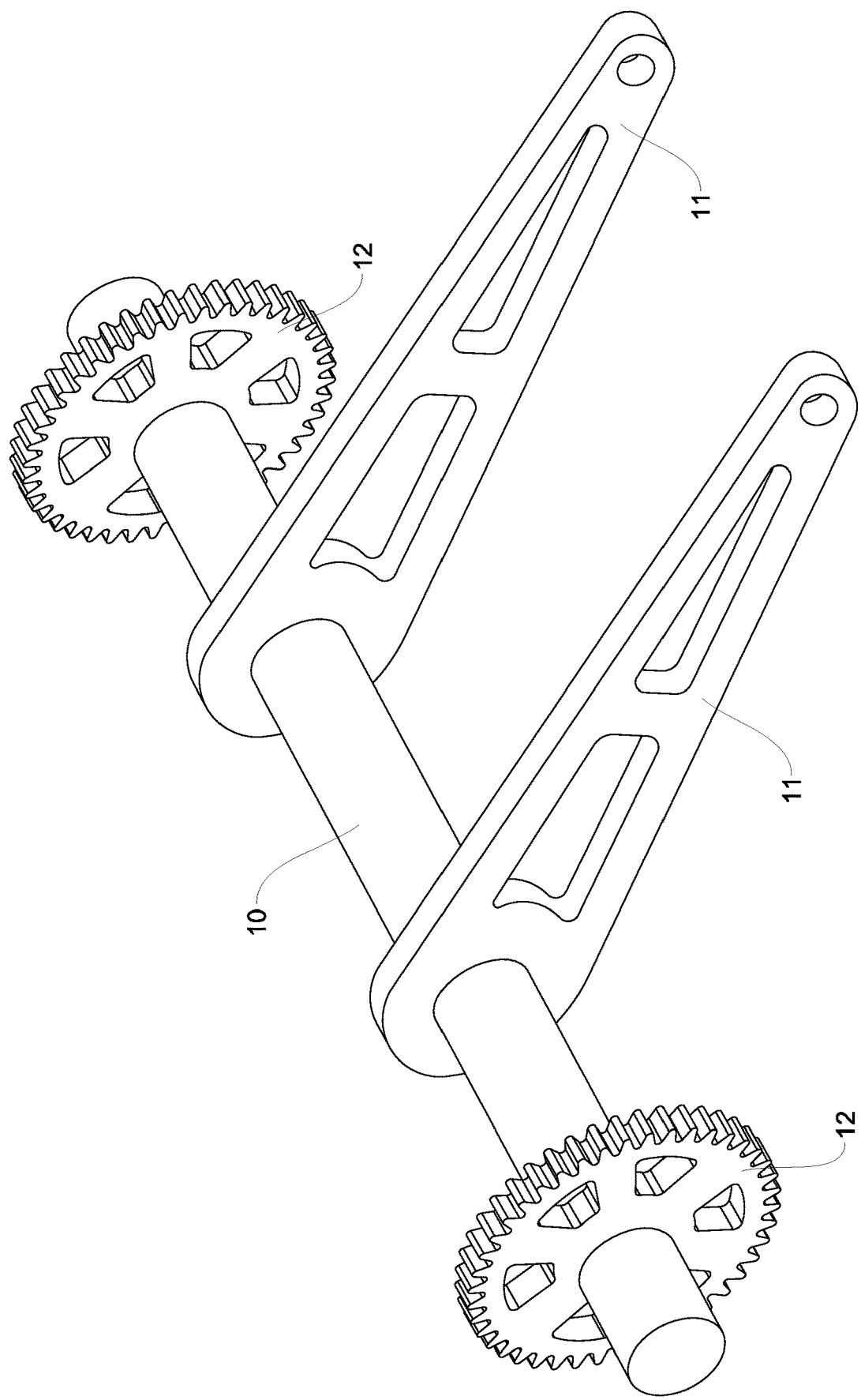
Figure 12:
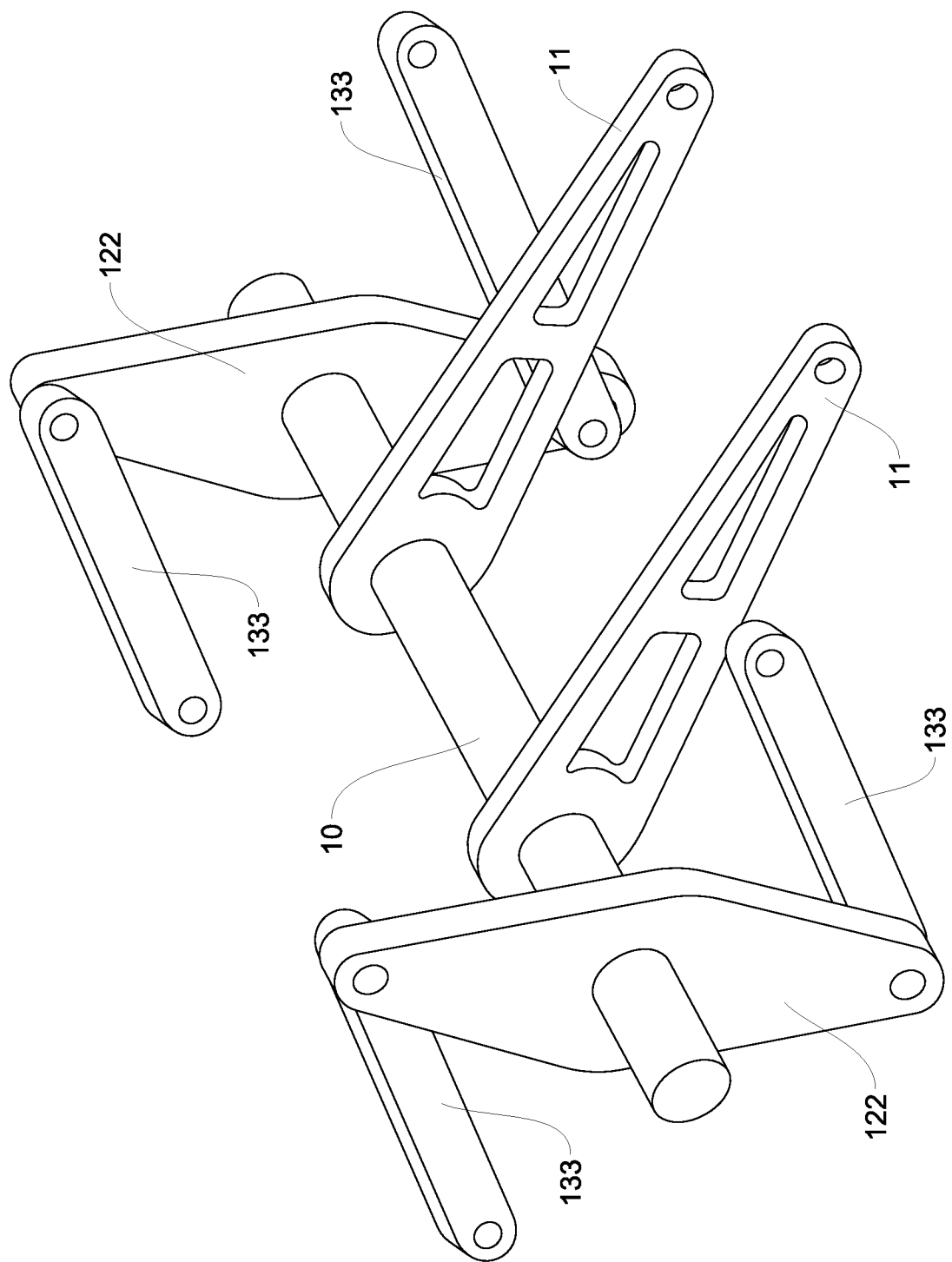
Figure 13:
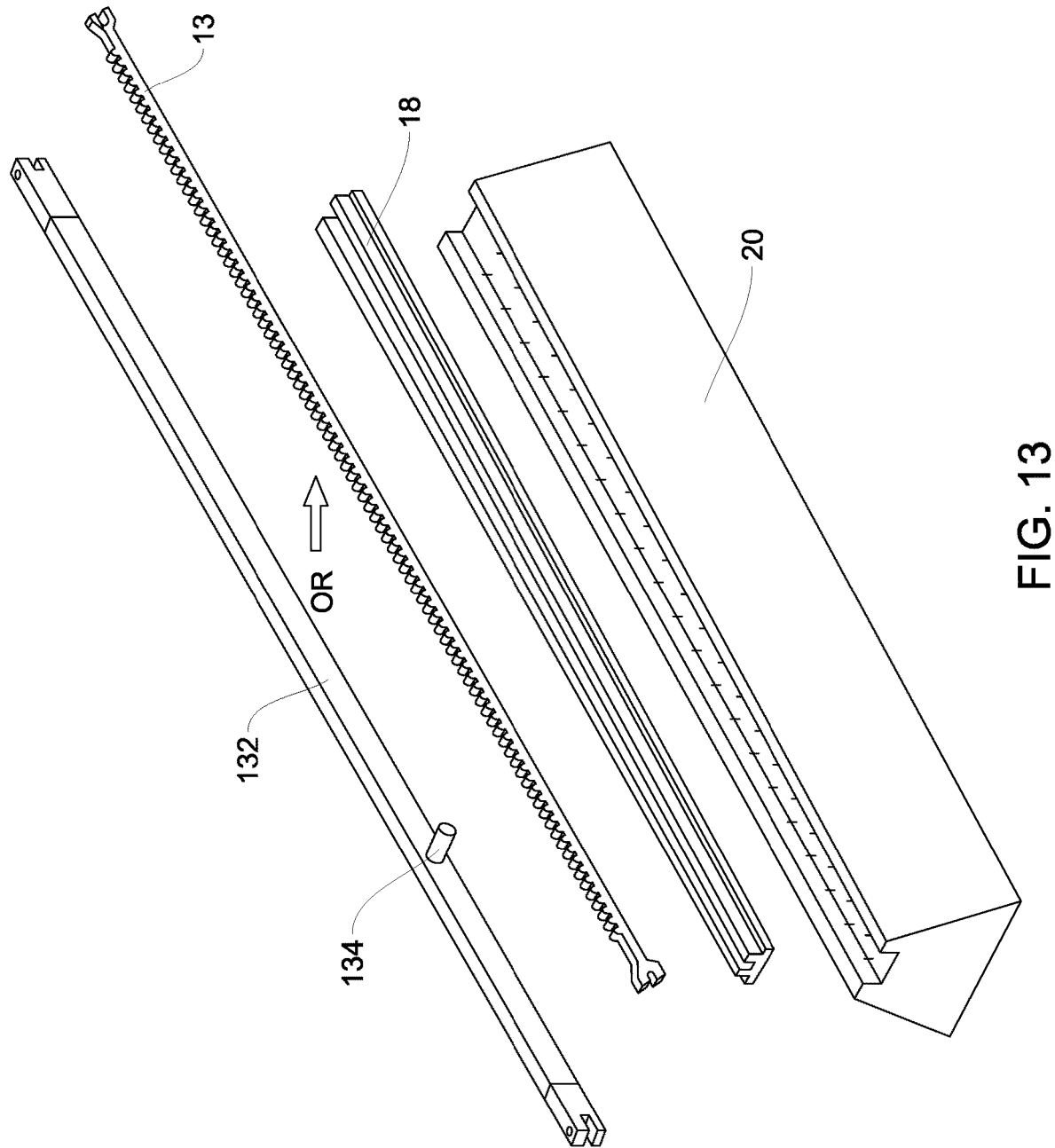

FIG. 11 presents a pictorial view of the axle with link arms and gear wheels accordant with the invention FIG. 12 presents a pictorial view of the axle with link arms and lever arm members alternative accordant with the invention FIG. 13 presents an assembly sequence of elongated gear toothed member on its elongated guide member and solid bed mounting. The alternative elongated plain member with coupling pin is also shown.

Figure 14:
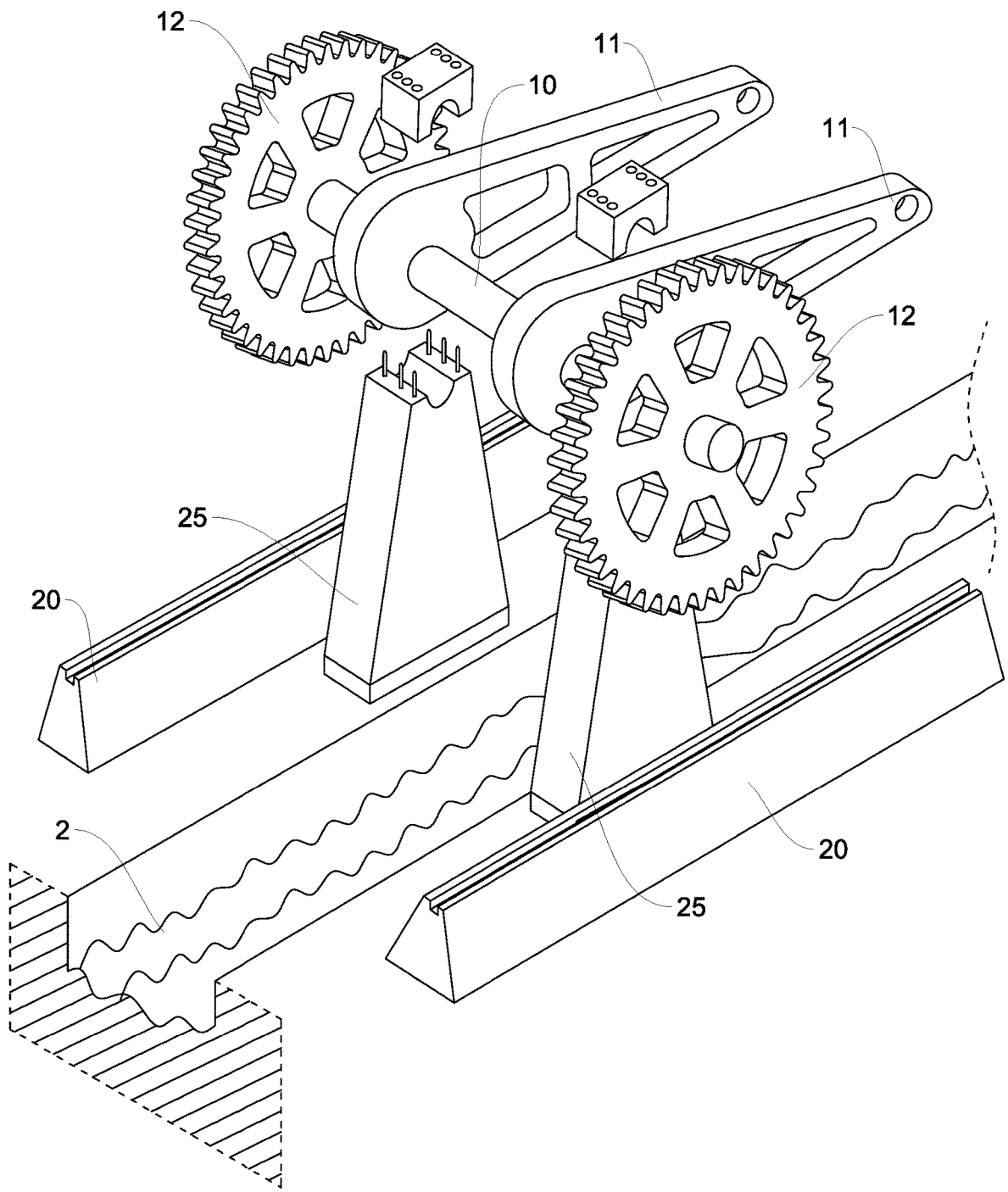

FIG. 14 presents a pictorial view of axle and gear wheel showing a mounting sequence on solid axle mounting across the canal with solid bed mountings for elongated guide members.

Figure 15:
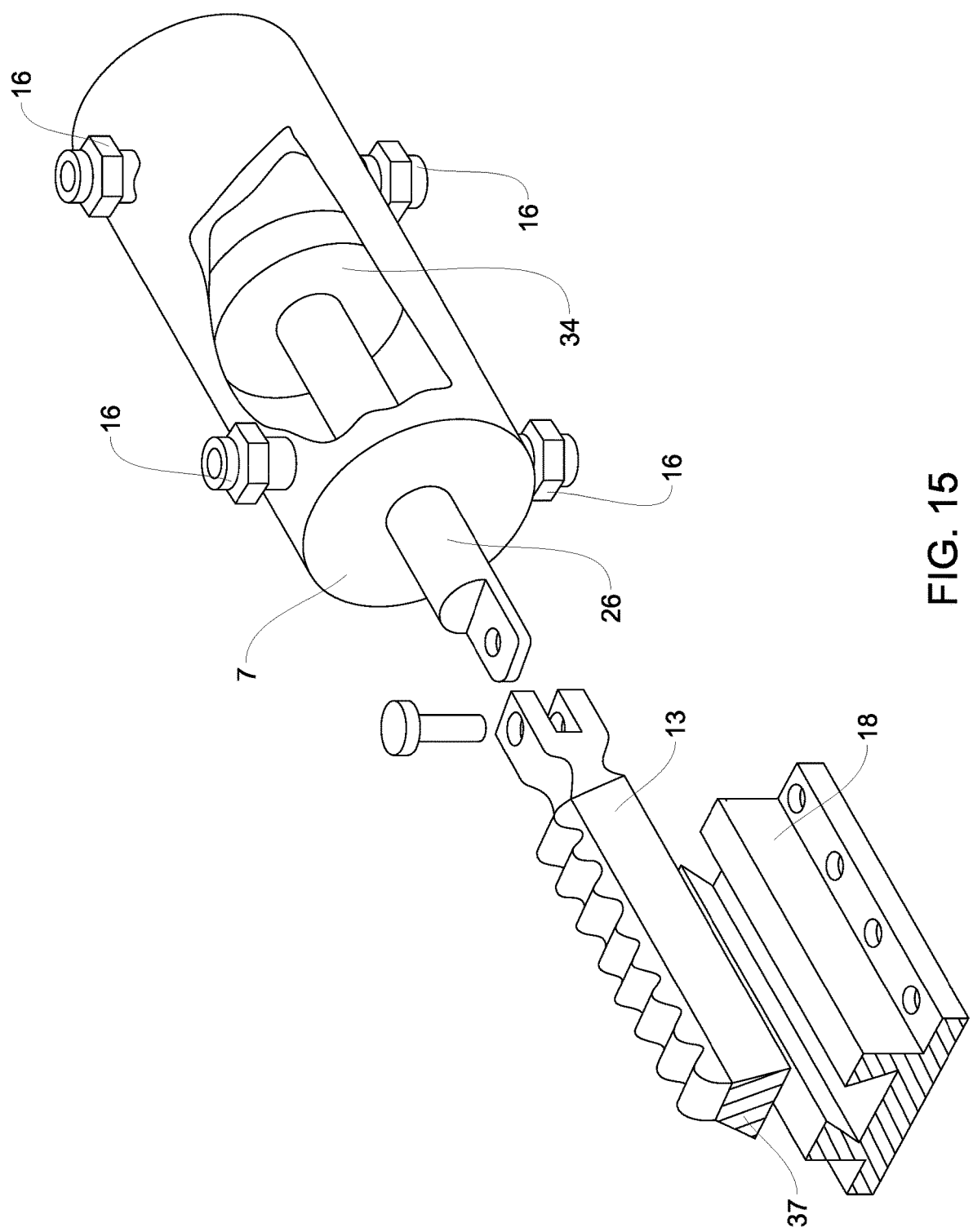

FIG. 15 presents a pictorial view of sectioned profiles of gear toothed elongated members in an assembly sequence with hydraulic pumping cylinder (cut-away showing piston and connecting rod)

Figure 16:
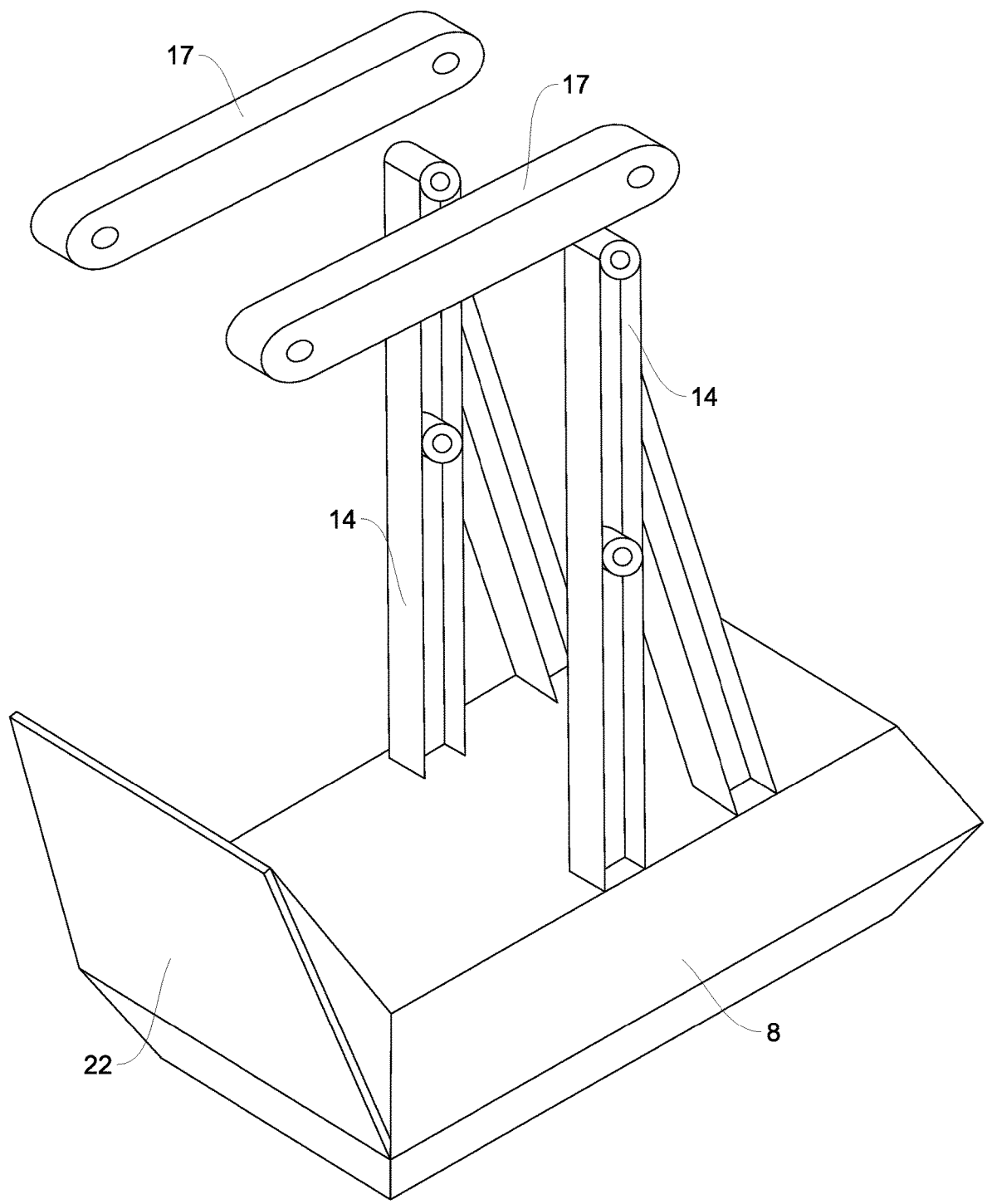

FIG. 16 presents pictorial view of buoyant vessel (float) with dismounted trailing link aims accordant with the invention.

Figure 17:
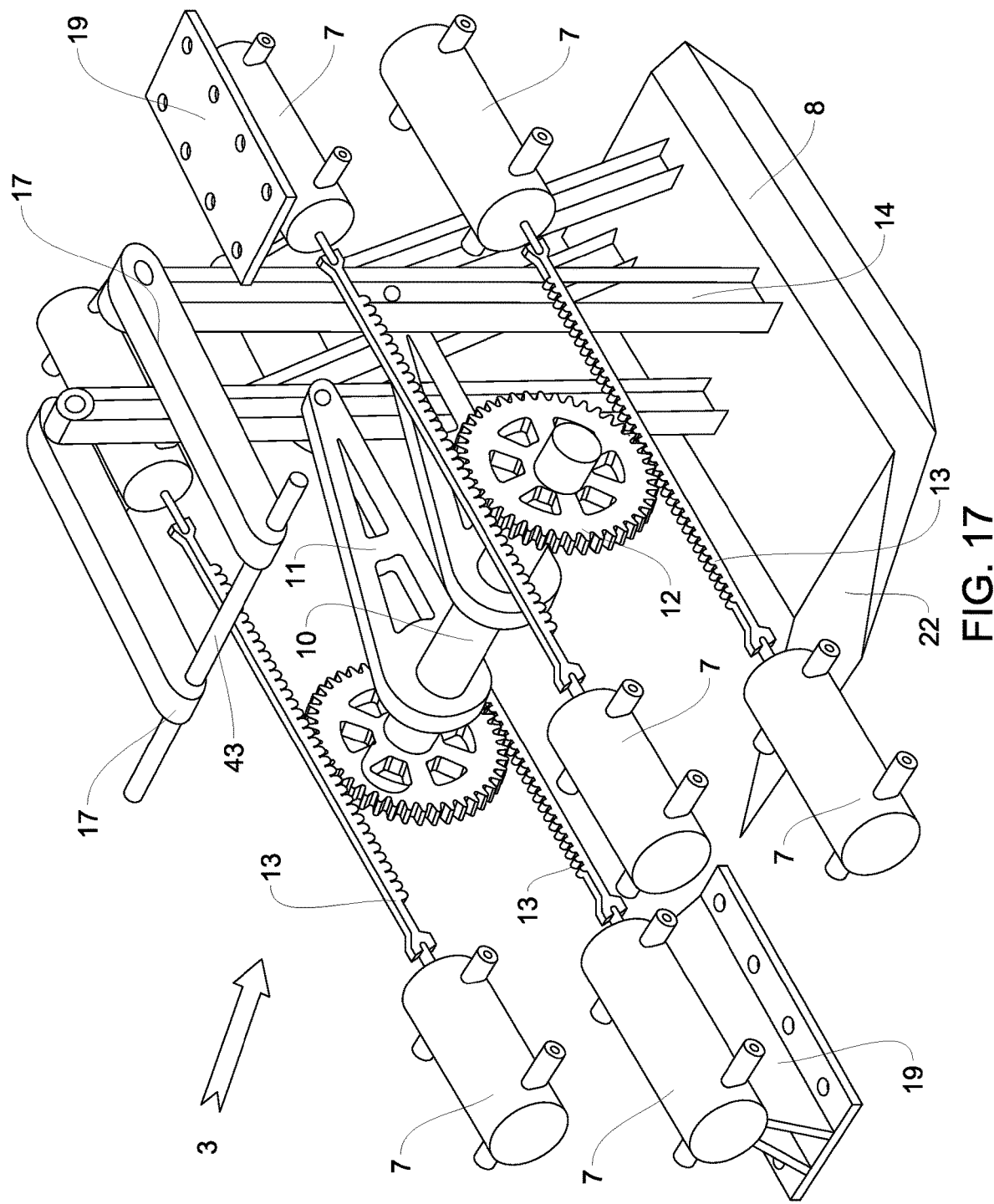

FIG. 17 presents pictorial view of power-take-off apparatus accordant with the invention (suspended in 'mid-air.') (Mountings, support frame and hydraulic piping not shown for purposes of clarity)

Figure 18:
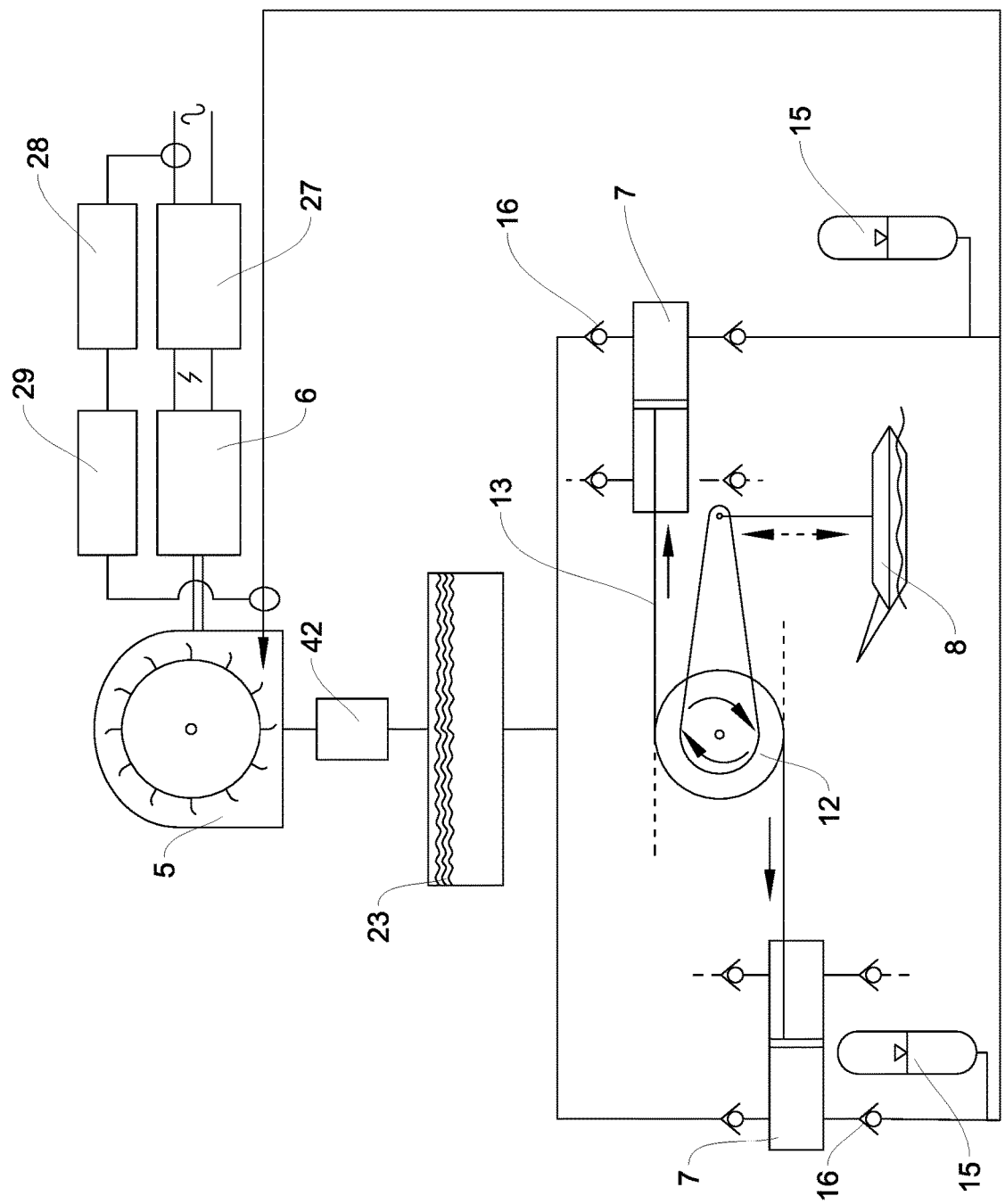

FIG. 18 presents a diagram of hydraulic circuit related to mechanical movements of selected parts to show complete functional operation of the invention.

Figure 19:
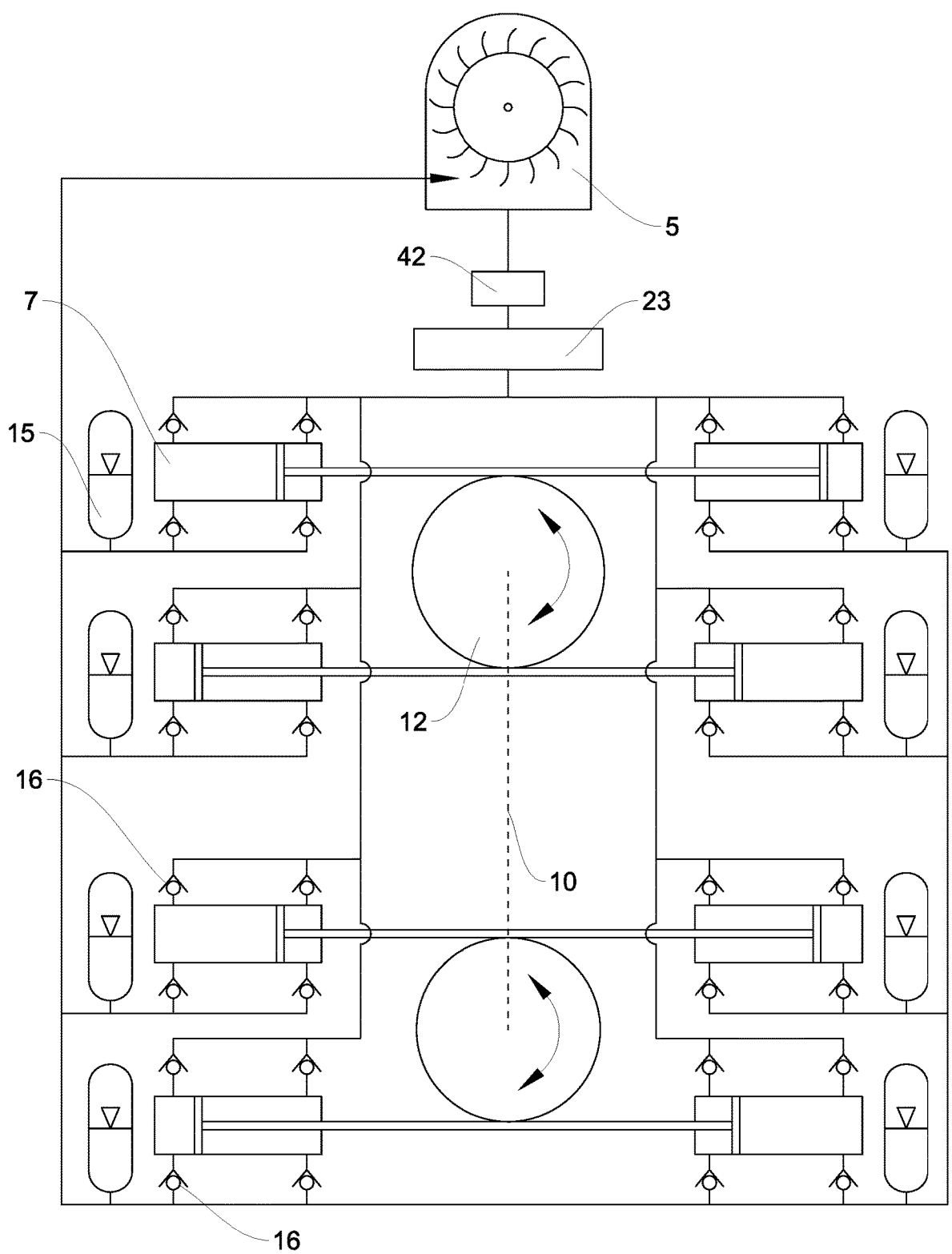

FIG. 19 presents a complete hydraulic circuit accordant with the invention showing the axle and gear wheel related connection and action.

Figure 20:
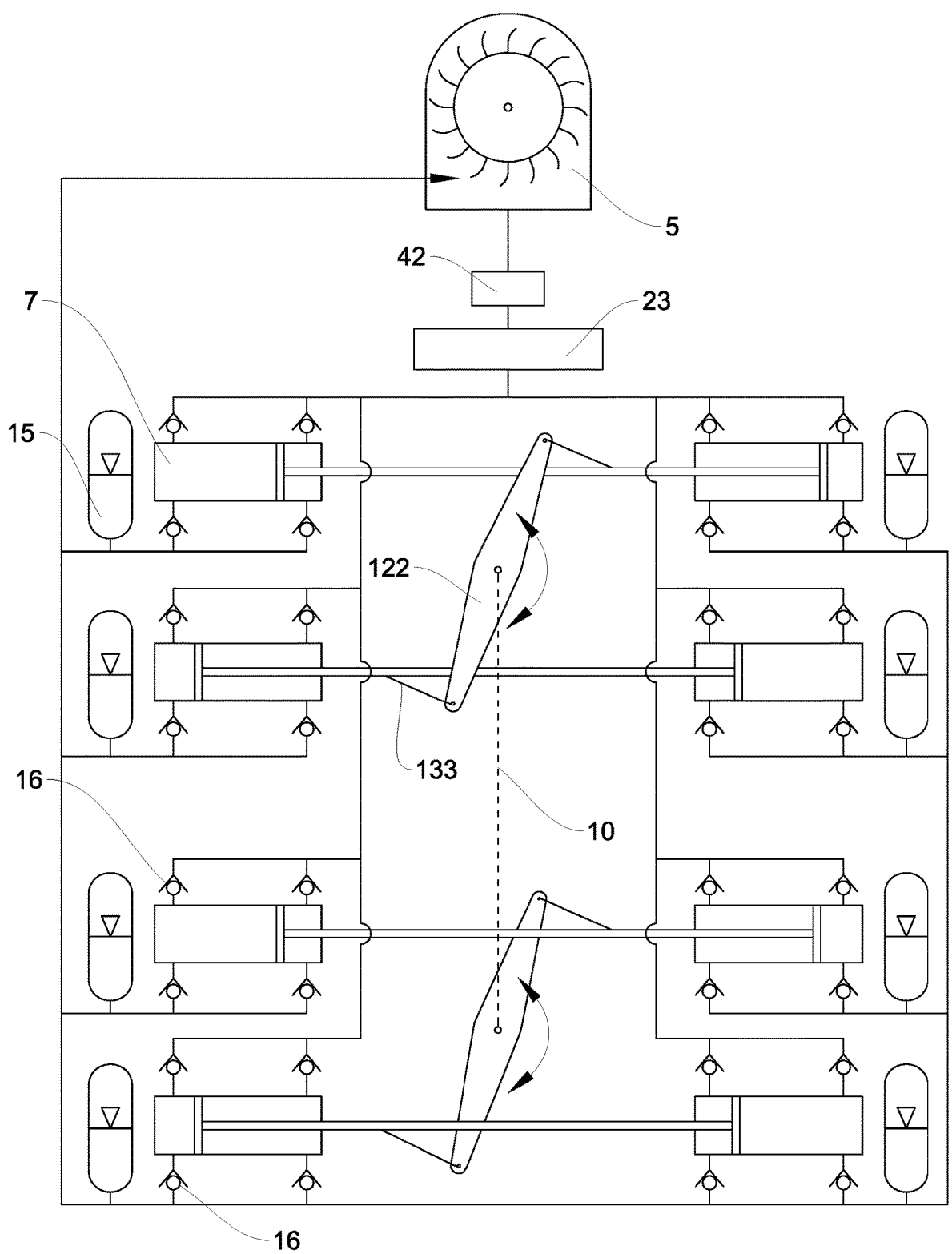

FIG. 20 presents a complete hydraulic circuit accordant with the invention showing the alternative axle and lever arm member related connection and action.

DETAILED DESCRIPTION OF THE INVENTION

Electric power generation utilizing a canal that taps water-wave energy from a large open water body in accordance with the present invention is achieved by means of a canal or tunnel (parallel sided channel 2) constructed through land and having a 'V' shaped mouth (funnel shaped channel 1) opening connecting it to the large open water body. The mouth opening is significantly wider than the general width of the canal or tunnel. The 'V' shaped wide mouth which traps and concentrates water waves and energy contained therein, narrows progressively from the connection point at the large open water body, to the width of the canal. The depth of the canal, from the 'mouth' all the way around its entire path, is dug or deepened to a predetermined depth which allows enough volume of water, considering the highest and lowest still-water levels of sea tide and highest and lowest movement of the buoyant vessel 8, to freely float it in the parallel sided channel 2. Water from the large open water body is allowed to freely flow to fill the whole funnel shaped channel 1 and parallel sided channel 2 until water levels equalize. Energy contained in water waves, propagating from a large open water body arriving at a coastline where the parallel sided channel 2 connects to the large open water body, is trapped at funnel shaped channel 1 and concentrated into the land based parallel sided channel 2 channeling it away from the large open water body. At the narrowest point of the funnel shaped channel 1, barrier doors 9 are positioned. These barrier doors 9 are kept open throughout all normal operations of the power take off apparatus 3. The barrier doors 9 are closed when the wave action threatens to destroy the power take off apparatus 3. To exploit some of the energy available during destructive wave energy action, apertures 39 with sliding flat plate shutters 40 are built into the gate. Under gradual control, the sliding flat plate shutters 40 are sufficiently opened to maximize wave energy passing into the parallel sided channel 2 without threatening the destruction of the power take off apparatus. In this and normal operation, the energy contained in the waves is channeled through the parallel sided channel 2 to arrive at a position along and within the canal where a buoyant vessel 8 is set. The wave action, in conjunction with the pull of earth's gravity, then causes the buoyant vessel 8 to move up and down. The up and down movement of the buoyant vessel 8 is mechanically linked to the power take off apparatus 3 which in turn translates the motion to turn large gear wheels 12, on an axle 10 mounted across the parallel sided channel 2, which pushes and pulls on pistons 34 in two-way pumping hydraulic cylinders 7 by means of gear toothed elongated member 13. The piston 34 movement pressurizes hydraulic fluid in the two way pumping hydraulic cylinders 7 which then drives an impulse turbine 5 which turns an electricity generator 6.

One apparatus accordant with the invention is described in more detail in FIGS. 1, 9, 17 and 18. The figures show one configuration as an example where the apparatus accordant with the invention comprises a single loop parallel sided channel 2, a funnel shaped channel 1 connected to the large open water body, two barrier doors 9 with apertures 39 with flat plate shutters 40 as further detailed in FIG. 5, a buoyant vessel 8 as further detailed in FIG. 16, two elongated trailing link arms 17 as further detailed in FIG. 16, an axle 10 with large gear wheels 12 as further detailed in FIG. 11, gear toothed elongated members 13, elongated guide members 18 for gear toothed elongated member 13, solid bed mountings 20 for elongated guide members, hydraulic fluid filter 42, hydraulic fluid supply reservoir 23, two-way pumping hydraulic cylinders 7 as further detailed in FIG. 15, buttressed mountings 19 for two-way pumping hydraulic cylinders 7, hydraulic non-return valves 16 as further detailed in FIG. 15, pressurizable hydraulic storage vessels 15, an impulse turbine 5, an electricity generator 6, a voltage step-up transformer 27 with associated generator output control apparatus 28 linked to fluid flow governing sensors and controls 29 at the impulse turbine 5, a hydraulic drain pump 30, a firm frame structure to mount hydraulic conduits and other modules, requisite fasteners and bearings.

From the connection at the coastline the canal is constructed such that the funnel shaped channel 1 has predetermined curved boundary walls 24 for efficient concentration of wave energy into the parallel sided channel 2. The walls and floors of the parallel sided channel 2 are lined with erosion-resistant materials 33. Barrier doors 9 are constructed across the parallel sided channel 2 to shut out or let wave action into the parallel sided channel 2. The barrier doors 9 have in-built apertures 39 covered by a controllable sliding flat plate shutter 40 to allow a controlled amount of wave power to travel through the parallel sided channel 2 when the barrier doors 9 are fully shut, when sea wave activity in the large open water body exceeds tolerable limits. The barrier doors 9, when shut, in conjunction with a hydraulic drain pump 30 that is set to pump water from the parallel sided channel 2 into the large open water body, serve as means to facilitate dry-dock maintenance on power take off apparatus 3. A buoyant vessel 8, forming part of power-take-off apparatus 3 to convert wave energy into machine motion energy, is situated to float in the parallel sided channel 2. A loop-back channel 4 is constructed continuing the parallel sided channel 2 at the back end of the buoyant vessel 8 to reroute residual wave energy back to the front end of the buoyant vessel 8. The front end is the end of the buoyant vessel 8 facing the oncoming wave and the back end is the end where the outgoing wave exits past the buoyant vessel 8 within the parallel sided channel 2. The buoyant vessel 8 has two upright pillars 14 vertically and solidly connected to it. The upright pillars 14 are positioned in such a way that when the buoyant vessel 8 is in the parallel sided channel 2, they are each close to different banks of the parallel sided channel 2. The buoyant vessel 8 is connected and anchored by the two upright pillars 14 which are hinged at or near the top to a pair of elongated trailing link arms 17 who's other ends are hinged to two fixed but different positions on an elongated anchor pin 43, aligned directly above the axis of the axle 10. On the upright pillars 14 of the buoyant vessel 8, at a distance equal to the distance from the top pivot point above the axle 10 to the center-line of the axle 10, measured from the top hinge of the upright pillar 14, the elongated axle arm member 11 of axle 10 is hinged so that the buoyant vessel 8 can float up and down vertically and push and pull the elongated axle arm members 11 that are solidly attached to an axle 10 mounted above and across the parallel sided channel 2. The length between end to end pivot points of the top elongated trailing link arms 17 being equal to the arc radius at pivot points of the elongated axle arm members 11 on the axle 10. Each end of the axle 10 is mounted, in a rotatable manner on a solid axle mounting 25, one on each and opposite bank of the parallel sided channel 2. Each end of the axle 10 has a large gear wheel 12 with gear teeth on its circumference. Four gear toothed elongated members 13 with a predetermined cross section 37 are mounted to horizontally mesh their gear teeth with the gear teeth of the large gear wheels 12 of the axle 10. For each large gear wheel 12, two gear toothed elongated members 13 mesh with it, one on the top side and the other on the bottom side. The length of the geared portion of the elongated member 13 is about one half of the pitch circle circumference of the large gear wheel 12 on the axle 10. Each gear toothed elongated member 13 is supported on an elongated guide member 18 mounted on a solid bed mounting 20 that allows it to slide longitudinally and in the same plane as the large gear wheel 12, whilst restricting it from buckling when the elongated member with gear teeth 13 is under longitudinal compression. The restriction from buckling is achieved by elongated guide members 18. The four gear toothed elongated members 13 are each, at the two ends, connected to connecting rods 26 of pistons 34 of two-way pumping hydraulic cylinders 7. The two-way pumping hydraulic cylinders 7 are horizontally mounted on the buttressed mountings 19. Each cylinder has the chambers, on both sides of the piston 34, set to pump fluid. Each chamber has an inlet conduit for incoming fluid and an output conduit for pressurized fluid. Hydraulic non-return valves 16 in the inlet and outlet conduits let in and let out hydraulic fluid respectively from the hydraulic fluid supply reservoir 23 and to a pressurizable hydraulic storage vessel 15 and an impulse turbine 5. The pressurizable hydraulic storage vessel 15 is set to store predetermined hydraulic pressure which is released into the system when the hydraulic pressure drops below a predetermined system hydraulic pressure. The hydraulic conduits from the two-way pumping hydraulic cylinders 7 connect to an impulse turbine 5 apparatus with fluid flow governing sensors and controls 29 for the pressurized hydraulic fluid. The fluid expelled at the impulse turbine 5 is rerouted by conduits back into the hydraulic fluid supply reservoir 23 through a hydraulic fluid filter 42. The impulse turbine 5 is coupled to turn an electricity generator 6. The electricity generator 6 output power is regulated through generator output control apparatus 28, and voltage stepped up for transmission to a power grid through a voltage step-up transformer 27.

The invention is not restricted to the example configurations presented above; many modifications are possible while remaining within the framework of the concept of the invention as specified in the claims.

| PARTS REFERENCE | |
|---|---|
| 1 | Funnel shaped channel |
| 2 | Parallel sided channel |
| 3 | Power take off apparatus |
| 4 | Loop-back channel |
| 5 | Impulse turbine |
| 6 | Electricity generator |
| 7 | Two way pumping hydraulic cylinder |
| 8 | Buoyant vessel |
| 9 | Barrier doors |
| 10 | Axle on power take off apparatus |
| 11 | Elongated axle arm members |
| 12 | Gear wheels on axle |
| 13 | Gear toothed elongated members |
| 14 | Upright pillars for buoyant vessel |
| 15 | Pressurizable hydraulic storage vessels |
| 16 | Hydraulic non-return valves |
| 17 | Elongated trailing link arms |
| 18 | Elongated guide members |
| 19 | Buttressed mounting for pumping cylinder |
| 20 | Solid bed mounting |
| 21 | Dyke walls |
| 22 | Skate plate of buoyant vessel |
| 23 | Hydraulic fluid supply reservoir |
| 24 | Curved boundary walls |
| 25 | Solid axle mounting |
| 26 | Connecting rod for pumping cylinder. |
| 27 | Voltage step-up transformer. |
| 28 | Output control apparatus for generator, |
| 29 | Fluid flow governing sensors. |
| 30 | Hydraulic drain pump |
| 31 | Internal floor angle on two barrier doors |
| 32 | Hydraulic cylinder actuator for barrier gate |
| 33 | Erosion resistant lining |
| 34 | Piston for hydraulic cylinder |
| 35 | |
| 36 | |
| 37 | Predetermined cross-section for gear toothed elongated member |
| 38 | Curved outer surface of barrier door |
| 39 | Apertures for wave motion control |
| 40 | Sliding flat plate shutter |
| 41 | Hydraulic cylinder actuator for shutter |
| 42 | Hydraulic fluid filter |
| 43 | Elongated anchor pin |
| 122 | Lever arm members |
| 132 | Plain elongated members |
| 133 | Elongated connecting member |
| 134 | Coupling pin |

What is claimed is:

1. A method of extracting energy from water waves in a large open water body to generate electric power from a predetermined excavated depths of three connected stages of land based channels; a funnel shaped channel (1), a parallel sided channel (2), and a loop-back channel (4), forming a continuous vertical walled channel on the land leading away from said large open water body whereby the water from said large open water body flows into said continuous vertical walled parallel sided channel (2), by the following steps:
   a. capturing a substantial amount of water from such water waves from said large open water body towards a shoreline into said parallel sided channel (2), wherein said funnel shaped channel (1) is connected to said parallel sided channel (2);
   b. concentrating said water waves into funnel shaped channel (1) to said large open water body and narrowing in the direction away from said open water body;
   c. controlling said waves action and kinetic energy exiting said funnel shaped channel (1) entering said parallel sided channel (2) by regulating or shutting off water wave activity, wherein the said parallel sided channel (2) is relatively narrow than said funnel shaped channel (1);
   d. channeling said waves motion into said parallel sided channel (2), wherein said parallel sided channel (2) is situated with a buoyant vessel (8) for transferring wave motion energy to a power take off apparatus (3);
   e. transferring said waves motion energy from said water waves in said parallel sided channel (2) by said buoyant vessel (8) connected to said power take off apparatus (3) for drawing and forcing hydraulic fluid through a cyclic network of hydraulic conduits assisted by al least one pressurizable hydraulic storage vessel (15), whereby said forced hydraulic fluid impinges on and turns an impulse turbine (5) for rotating an electricity generator (6) to generate electric power; and
   f. routing said parallel sided channel (2) beyond position of said buoyant vessel (8) in a more or less circular path making said loop-back channel (4) leading back to said buoyant vessel (8) to extract residual wave motion energy.

2. The method according to claim 1, wherein the controlling of the flow of water from said waves at the entrance to said parallel sided channel (2) is achieved by two barrier doors (9) is hinged on each vertical wall of said parallel sided channel (2) and opposite to each other and wherein water from such waves is stopped when said two barrier doors (9) are closed, wherein each of the said two barrier doors (9) having an aperture (39) to allow a controlled amount of water from said waves into said parallel sided channel (2).

3. The method according to claim 2, wherein the controlled amount of water from said waves is regulated by sliding a flat plate shutter (40) covering said apertures (39) in said two barrier doors (9).

4. The method according to claim 1, a continuous of the land based to said parallel sided channel (2) is excavated to the predetermined depth to float said buoyant vessel (8) of tide in said large open water body and highest and lowest movement of said buoyant vessel (8) to freely float it in said parallel sided channel (2).

5. An apparatus for containing water waves kinetic energy from a large open water body passing through a parallel sided channel (2) system excavated on land adjacent to said large open water body and converting the contained wave kinetic energy into electric energy, the apparatus comprising:
   a funnel shaped channel (1) adapted to be excavated over land to trap and concentrate the waves kinetic energy;
   at least two dyke walls (21), two barrier doors (9) with apertures (39) closed by sliding a flat plate shutter (40) operated by an associated powering and control system, wherein the control system controls the water wave movement and kinetic energy, said flat plate shutter (40) having a hydraulic cylinder actuator (41);

at least two hydraulic cylinder actuators (32) with the associated powering and control system, wherein the control system opens and closes said two barrier doors (9);

the land based parallel sided channel (2) comprises a circular, spiral or an eight-shaped path, a buoyant vessel (8), a power take off apparatus (3), a working hydraulic fluid, a plurality of two-way pumping hydraulic cylinders (7), at least one hydraulic conduits, at least one pressurizable hydraulic storage vessels (15), at least one hydraulic non-return valve (16), at least one hydraulic fluid filter (42), at least one hydraulic fluid supply reservoir (23), an impulse turbine (5), fluid flow governing sensors and controls (29) for said impulse turbine (5), an electricity generator (6), a voltage step-up transformer (27) with an associated generator output control apparatus (28), a structurally stable and stiff framework assembly, a hydraulic drain pump (30) with requisite power and controls, fasteners, brackets, bearings, electrical gauges, conductors and switches.

6. The apparatus according to claim 5, wherein said funnel shaped channel (1) is connected at the wide end to said large open water body at a coastline and, on the narrow end and connected to said parallel sided channel (2).

7. The apparatus according to claim 5, wherein said funnel shaped channel (1) is lined with erosion resistant materials (33) for the floor and side walls.

8. The apparatus according to claim 5, wherein said funnel shaped channel (1) has predetermined curved boundary walls (24) for efficient concentration of said wave kinetic energy into said parallel sided channel (2).

9. The apparatus according to claim 5, wherein said two barrier door (9) are situated at a narrow end of said funnel shaped channel (1) of said buoyant vessel (8) in said parallel sided channel (2).

10. The apparatus according to claim 5, wherein said barrier doors (9) are each hinged on opposite vertical walls of said parallel sided channel (2).

11. The apparatus according to claim 10, wherein each of the said two barrier doors (9) comprises the aperture (39) covered by sliding the flat plate shutter (40) in horizontal grooves below and above it which are welded to each said two barrier doors (9).

12. The apparatus according to claim 11, wherein said flat plate shutter (40) is closed or opened by the hydraulic cylinder actuator (41) having a connecting rod.

13. The apparatus according to claim 12, wherein two of the connecting rods of two of the said hydraulic cylinder actuators (41) are each rotatably fixed to the front surface of each said flat plate shutter (40) whilst the other end of said hydraulic cylinder actuator (41) is rotatably anchored to appropriate curved surface of each said two barrier doors (9).

14. The apparatus according to claim 12, wherein said hydraulic cylinder actuator (41) is powered and controlled with the associated powering and control system.

15. The apparatus according to claim 5, wherein when said two barrier doors' (9) free vertical edges close an internal floor angle (31) between 90° and 180°.

16. The apparatus according to claim 5, wherein each of the at least two hydraulic cylinder actuators (32) along one end comprises a least one connecting rod rotatably fixed to the curved surface of each said two barrier doors (9) whilst the other end of the at least two hydraulic cylinder actuator (32) body is rotatably anchored to a bank of said parallel sided channel (2).

17. The apparatus according to claim 16, wherein said at least two hydraulic cylinder actuators (32) are powered and controlled by the associated powering and control system.

18. The apparatus according to claim 5, wherein the outer surfaces (38) of said two barrier doors (9) are curved outwards to improve structural strength of said doors and withstand forces from oncoming water waves.

19. The apparatus according to claim 5, wherein on each side of the said parallel sided channel (2) is horizontally perpendicular to the same said parallel sided channel (2), at said two barrier doors (9) position, wherein one of the at least two dyke walls (21) is erected to shield the said power take off apparatus (3) against destructive waves.

20. The apparatus according to claim 5, wherein said parallel sided channel (2), including a loop-back channel (4) leading to said buoyant vessel (8), is lined with erosion resistant materials (33) on the floor and side walls.

21. The apparatus according to claim 5, wherein said parallel sided channel (2), includes the loop-back channel (4) leading to said buoyant vessel (8) with a capacity to accommodate the water from said water wave.

22. The apparatus according to claim 5, wherein said buoyant vessel (8) is a hollow, covered, internally reinforced enclosure whose width is slightly less than the width of said parallel sided channel (2).

23. The apparatus according to claim 22, wherein said buoyant vessel (8) has at least two upright pillars (14) to rotatably couple said buoyant vessel (8) to said power take off apparatus (3).

24. The apparatus according to claim 22, wherein said at least two upright pillars (14) on said buoyant vessel (8) have, each, two coupling points to the right buoyant vessel (8) as it floats in said parallel sided channel (2).

25. The apparatus according to claim 22, wherein said buoyant vessel (8) has a skate plate (22) for said buoyant vessel (8) to ride approaching high waves.

26. The apparatus according to claim 5, wherein said buoyant vessel (8) is positioned to float in said parallel sided channel (2).

27. The apparatus according to claim 5, wherein said power take off apparatus (3) comprises:

an axle (10) coupled with two gear wheels (12), one at each end, a plurality of elongated axle arm members (11) solidly attached to said axle (10), at least two elongated trailing link arms (17), for the two gear wheels (12) are not used on the axle (10), at least two lever arm members (122) solidly fixed on each end on the axle (10), a pair of solid axle mountings (25) anchored into the ground each bank of said parallel sided channel (2), a plurality of gear toothed elongated members (13) with a predetermined cross section (37) coupled to the holes on both ends, said plurality of gear toothed elongated members (13) having upper gear toothed elongated members and lower gear toothed elongated members;

a plurality of plain elongated members (132) with a predetermined cross section coupling the holes on both ends and a coupling pin (134) between the ends when the at least two lever arm members (122), a plurality of elongated connecting members (133), the plurality of two-way pumping hydraulic cylinders (7), each having a connecting rod (26) coupled to one end of a gear toothed elongated member (13) of the plurality of gear toothed elongated member (13) or a plain elongated member of said plurality of plain elongated members (132), wherein the at least two lever arm members (122) are used, with said at least one hydraulic non-return valve (16), said at least one hydraulic conduit, and an elongated anchor pin (43) are supported by frames for said upper gear toothed elongated members (13) for at least two elongated guide members (18), for said upper gear toothed elongated members (13), solid bed mountings (20) for said lower gear toothed elongated member (13), and another at least two elongated guide members (18) for the said lower gear toothed elongated members (13), buttressed mountings (19) for said plurality of two-way pumping hydraulic cylinders (7).

28. The apparatus according to claim 27, wherein said axle (10) is solidly attached to said two gear wheels (12) each at each end of said axle (10).

29. The apparatus according to claim 27, wherein said axle (10) is solidly attached to said at least two lever arm members (122) each at each end of said axle (10) when two said gear wheels (12) are not used.

30. The apparatus according to claim 27, wherein said plurality of elongated connecting members (133) are each rotatably connected on one end on said at least two lever arm members (122) and the other end rotatably connected to said plurality of plain elongated members (132), at said coupling pin (134) when said at least two lever arm members (122) are used.

31. The apparatus according to claim 27, wherein said axle (10) is rotatably mounted horizontally on the ends perpendicular across and above said parallel sided channel (2) on said pair of solid axle mountings (25) fixed and anchored into the ground.

32. The apparatus according to claim 27, wherein said at least two upright pillars (14) attached to said buoyant vessel (8) are connected rotatably to said axle (10) by said plurality of elongated axle arm member (11), and said at least two elongated trailing link arms (17) whose other ends are connected to freely rotate about said elongated anchor pin (43) fixed vertically above the axis of said axle (10).

33. The apparatus according to claim 27, wherein said plurality of gear toothed elongated members (13) are mounted horizontally, one above and one below each of the said gear wheels (12) coplanar and meshing with same said gear wheels (12).

34. The apparatus according to claim 27, wherein when said at least two lever arm members (122) are used, said plurality of plain elongated members (132) are mounted horizontally, two connecting pumping cylinders above axle (10) and the other two connecting pumping cylinders below axle (10).

35. The apparatus according to claim 27, wherein said plurality of gear toothed elongated members (13) are slidably mounted on said elongated guide members (18) fixed on said mountings above and on the ground in said firm support frame and said solid bed mountings (20) respectively thereby preventing buckling when said plurality of gear toothed elongated members (13) are under longitudinal compression or experiencing radial pressure from said gear wheels (12).

36. The apparatus according to claim 27, wherein said elongated members (13) are slidably mounted on said elongated guide members (18) fixed on said mountings above and on the ground in said firm support frame and said solid bed mountings (20) respectively thereby preventing buckling when said plurality of plain elongated members (132) are under linear compression from said plurality of elongated connecting members (133).

37. The apparatus according to claim 27, wherein said plurality of gear toothed elongated members (13) have gear teeth cut on one face for a length approximately one half of said gear wheels (12) pitch circle circumference.

38. The apparatus according to claim 27, wherein said plurality of two-way pumping hydraulic cylinders (7) are fixed on said buttressed mountings (19) and coupled via said connecting rods (26) coplanar and in alignment to said plurality of gear toothed elongated member (13) or said plurality of plain elongated members (132) when said at least two lever arm members (122) are used.

39. The apparatus according to claim 27, wherein two said hydraulic non-return valve (16) are connected to said plurality of two-way pumping hydraulic cylinders (7) to chambers on each side of a piston (34) therein, such that one said hydraulic non-return valve (16) only allows fluid in and the other only allows fluid to exit the chamber.

40. The apparatus according to claim 27, wherein said at least one pressurizable hydraulic storage vessels (15) is connected by a T-joint to said plurality of two-way pumping hydraulic cylinders (7) at their output ports through said at least one hydraulic non-return valve (16).

41. The apparatus according to claim 27, wherein said plurality of two-way pumping hydraulic cylinders (7) are connected by a network of hydraulic conduits to each other through said at least one hydraulic non-return valve (16) and after the connection to said at least one pressurizable hydraulic storage vessel (15), by a piston (34), the chambers that are pressurizing connect to a common output and chambers that are drawing connect to a common fluid input.

42. The apparatus according to claim 41, wherein said network of hydraulic conduits common output conduit from said at least one pressurizable hydraulic storage vessels (15) connects to said impulse turbine (5).

43. The apparatus according to claim 5, wherein said impulse turbine (5) is mounted at a higher elevation than all said plurality of two-way pumping hydraulic cylinders (7) and said at least one hydraulic fluid supply reservoir (23) to supply said plurality of two-way pumping hydraulic cylinders (7) with hydraulic fluid by earth's gravity.

44. The apparatus according to claim 5, wherein said impulse turbine (5) comprises said fluid flow governing sensors and controls (29).

45. The apparatus according to claim 5, wherein said impulse turbine (5) is coupled coaxially to turn said electricity generator (6).

46. The apparatus according to claim 5, wherein said electricity generator (6) is electrically connected to said voltage step-up transformer (27) and said generator output control apparatus (28).

47. The apparatus according to claim 5, wherein said generator output control apparatus (28) are electrically connected to said fluid flow governing sensors and controls (29) at said impulse turbine (5) thereby supplying necessary fluid flow control data for said impulse turbine (5).

48. The apparatus according to claim 5, wherein said hydraulic fluid from said impulse turbine (5) is drained to said at least one hydraulic fluid supply reservoir (23) though said at least one hydraulic fluid filter (42).

49. The apparatus according to claim 5, wherein said at least one hydraulic fluid supply reservoir (23) connects, from its bottom, by hydraulic conduits in said hydraulic conduit network to said hydraulic non-return valve (16) at intake part of said plurality of two-way pumping hydraulic cylinders (7).

50. The apparatus according to claim 5, wherein said structurally stable and stiff framework assembly supports said hydraulic conduit network and other fixed anchor points such as an elongated anchor pin (43) for said at least two elongated trailing link arms (17).

51. The apparatus according to claim 5, wherein said power take off apparatus (3) comprises moving links and gear meshing parts that are lubricated by biodegradable grease or biodegradable oil as appropriate.

52. The apparatus according to claim 5, wherein said power take off apparatus (3) comprises moving links and gear meshing parts that are lubricated by grease derived from petroleum or oil derived from the petroleum as working fluid as may be appropriate.

53. The apparatus according to claim 5, wherein said hydraulic cylinder actuators (32, 41) operates said two barrier doors (9) and said flat plate shutter (40) respectively that use hydraulic biodegradable oil as working fluid.

54. The apparatus according to claim 5, wherein said hydraulic cylinder actuators (32, 41) operates said two barrier doors (9) and to slide the flat plate shutter (40) respectively by using hydraulic oil derived from petroleum as a working fluid.

55. The apparatus according to claim 5, wherein said power take off apparatus (3) is assembled to said stiff structure using said fasteners, said brackets and said bearings.

56. The apparatus according to claim 5, wherein said hydraulic drain pump (30) is installed close to said two barrier doors (9) drain water from said parallel sided channel (2) into the said large open water body when the dry-dock needs maintenance to be carried out on said buoyant vessel (8) and said power take off apparatus (3).

57. The apparatus according to claim 56, wherein said hydraulic drain pump (30) is connected to power and controls.

* * * * *